US007010505B2

(12) United States Patent
Boutilier et al.

(10) Patent No.: US 7,010,505 B2
(45) Date of Patent: Mar. 7, 2006

(54) METHOD OF SELECTING ONE OR MORE BIDS IN A COMBINATORIAL AUCTION

(75) Inventors: Craig E. Boutilier, Toronto (CA); Holger H. Hoos, Vancouver (CA)

(73) Assignee: CombineNet, Inc., Pittsburgh, PA (US)

( * ) Notice: Subject to any disclaimer, the term of this patent is extended or adjusted under 35 U.S.C. 154(b) by 765 days.

(21) Appl. No.: 09/918,164

(22) Filed: Jul. 30, 2001

(65) Prior Publication Data

US 2002/0052829 A1 May 2, 2002

Related U.S. Application Data

(60) Provisional application No. 60/221,551, filed on Jul. 28, 2000.

(51) Int. Cl.
*G06F 17/60* (2006.01)

(52) U.S. Cl. ........................................................ 705/26

(58) Field of Classification Search .................. 705/26, 705/27, 37
See application file for complete search history.

(56) References Cited

U.S. PATENT DOCUMENTS

| | | | | |
|---|---|---|---|---|
| 6,272,473 B1 * | 8/2001 | Sandholm | .................... | 705/37 |
| 6,704,716 B1 | 3/2004 | Force | | |
| 6,718,312 B1 * | 4/2004 | McAfee et al. | ............... | 705/37 |
| 2003/0225677 A1 * | 12/2003 | Sandholm et al. | ............ | 705/37 |

FOREIGN PATENT DOCUMENTS

JP 410224301 A * 8/1998

OTHER PUBLICATIONS

U.S. Appl. No. 60/183,674.*
Sandholm, Tuomas: "Approaches to winner determination in combinatorial auctions"; Elsevier Science; V28, I1-2, p165-176; Mar., 2000.*
U.S. Appl. No. 60/221,551.*
E. Arkin and R. Hassin, "On Local Search For Weighted *k*-Set Packing", European Symposium on Algorithms, pp. 15, (1997).
S. Bikhchandani and J. Mamer, "Competitive Equilibrium In An Exchange Economy With Indivisibilities", Journal of Economic Theory: 74, 385-413, (1997).
B. Chandra and M. Halldórsson, "Greedy Local Improvement And Weighted Set Packing Approximation", SODA, pp. 8, (1999).
C. Boutilier, M. Goldszmidt and B. Sabata, "Sequential Auctions For The Allocation Of Resources With Complimentarities", International Joint Conference on Artificial Intelligence, pp. 8, (1999).
Y. Fujishima, K. Leyton-Brown and Y. Shoham, "Taming The Computational Complexity Of Combinatorial Auctions: Optimal And Approximate Approaches", International Joint Conference on Artificial Intelligence, pp. 6, (1999).
D. Hausch, "Multi-Object Auctions: Sequential Vs. Simultaneous Sales", Management Sciences, vol. 32, No. 12, 1599-1610, Dec. 1986.

(Continued)

*Primary Examiner*—Jeffrey A. Smith
(74) *Attorney, Agent, or Firm*—The Webb Law Firm

(57) ABSTRACT

A method of selecting a winning allocation of bids in a combinatorial auction includes receiving a plurality of bids and designating a subset of the received bids as a current allocation having no overlap in the items of its bids. For each bid not part of the current allocation, a neighboring allocation is determined by combining the bid with the current allocation and deleting from such combination any bid of the current allocation having an item that overlaps an item of the bid combined with the current allocation. A heuristic is determined for each neighboring allocation and one of the neighboring allocations is selected stochastically or based on its heuristic. If this one neighboring allocation is greater than the value of the best allocation, the current allocation is substituted for the best allocation.

20 Claims, 5 Drawing Sheets

OTHER PUBLICATIONS

H. Hoos and T. Stüzle, "Evaluating Las Vegas Algorithms—Pitfalls And Remedies", UAI, pp. 8, (1998).
H. Hoos, "On The Run-Time Behaviour Of Stochastic Local Search Algorithms For SAT", American Association for Artificial Intelligence, pp. 6, (1999).
K. Leyton-Brown, Y. Shoham and M. Tennenholtz, "An Algorithm For Multi-Unit Combinatorial Auctions", American Association for Artificial Intelligence, pp. 6, (2000).
O. Martin, S. Otto and E. Felten, "Large-Step Markov Chains For The Traveling Salesman Problem", Complex Systems, vol. 5:3 pp. 29, (1991).
D. McAllester, B. Selman and H. Kautz, "Evidence For Invariants In Local Search", Proceedings of the Fourteenth National Conference on Artificial Intelligence, pp. 6, (1997).
S.J. Rassenti, V.L. Smith and R.L. Bulfin, "A Combinatorial Auction Mechanism For Airport Time Slot Allocation,", The Bell Journal of Economics, 402-417 (1982).
M. Rothkopf, "Bidding In Simultaneous Auctions With A Constraint On Exposure", Operations Research, vol. 25, No. 4, 620-629, Jul.-Aug. 1977.
M. Rothkopf, A. Pekeč and R. Harstad, "Computationally Manageable Combinatorial Auctions", DIMAC Technical Report 95-09, pp. 17, Apr. 1995.
T. Sandholm, "An Algorithm For Optimal Winner Determination In Combinatorial Auctions", International Joint Conference on Artificial Intelligence, pp. 6, (1999).
M. P. Wellman, W. Walsh, P. Wurman and J. MacKie-Mason, "Auction Protocols For Decentralized Scheduling", Games and Economic Behavior, 35, 271-303 (2001).
R. Engelbrecht-Wiggans and R. Weber, "A Sequential Auction Involving Asymmetrically Informed Bidders", International Journal of Game Theory, vol. 12, Issue 2, pp. 123-127 (1983).

* cited by examiner

METHOD OF SELECTING ONE OR MORE BIDS IN A COMBINATORIAL AUCTION

CROSS REFERENCE TO RELATED APPLICATION

The present invention claims priority from U.S. Provisional Patent Application Ser. No. 60/221,551, filed Jul. 28, 2000, entitled "Stochastic Local Search for Combinatorial Auctions".

BACKGROUND OF THE INVENTION

1. Field of the Invention

The present invention relates to a method of winner determination in combinatorial auctions.

2. Description of the Prior Art

Combinatorial auctions have emerged as a useful tool for determining resource allocations. Unfortunately, winner determination for combinatorial auctions is NP-hard and current methods have difficulty with combinatorial auctions involving goods and bids beyond the hundreds.

Combinatorial auctions are a form of auction in which a seller with multiple items for sale accepts bids on bundles, or combinations of items. When items exhibit complementarities for potential buyers, that is when certain items are less valuable unless complementary items are obtained, allowing combinatorial bids generally reduces a bidder's risk and allows for a more efficient allocation of goods, and greater seller revenue than had the items been auctioned individually, either sequentially or simultaneously. Given a set of combinatorial bids on a collection of items, the winner determination problem is that of allocating items to bidders, i.e., determining the winning bids/bundles, so as to maximize the seller's revenue. Applications of combinatorial auctions range from commodities trading, to resource allocation, to scheduling, to logistics planning, and the selling of any goods that exhibit complementarities, e.g., broadcast spectrum rights, airport gate allocations, and the like.

A combinatorial auction process will now be generally described with reference to FIG. 1. Assume a seller or auctioneer has a set G of M goods for sale and various potential buyers are interested in certain collections, or bundles, of these goods. Because of complementarities, the seller allows buyers to offer bundle bids. Namely, a buyer can offer to purchase a bundle of goods without committing to purchase anything but the complete bundle. A buyer can also bid on many distinct bundles involving overlapping bundles. Each bid B can comprise the entire set G or a subset of set G of the M goods and a corresponding monetary bid V. In a combinatorial auction, the seller can receive a collection of these bids from any number of potential buyers.

The problem of winner determination in a combinatorial auction is to find a subset of received bids where the sum of the monetary bid values of the non overlapping bids is maximal, thus maximizing the seller's revenue. Stated differently, the winner determination problem is to find an allocation where each bid is disjoint, and the sum of the monetary bids of the allocation is maximal.

It is an object of the present invention to provide a stochastic local search method that finds high quality, even optimal, allocations in a combinatorial auction much faster than prior art methods, particularly for large problems. Still other objects of the present invention will become apparent to those of ordinary skill in the art upon reading and understanding the following detailed description.

SUMMARY OF THE INVENTION

Accordingly, we have invented a method of selecting one or more winning bids in a combinatorial auction. The method includes the steps of: (a) receiving a plurality of bids each comprising one or more items and an associated value for the one or more items; (b) designating a subset of the bids as a current allocation, when the current allocation includes two or more bids, each bid of the current allocation has no item in common with another bid of the current allocation; (c) determining a plurality of neighboring allocations, with each neighboring allocation comprising a combination of the current allocation and a new bid selected from the bids not part of the current allocation or any other neighboring allocation, with each neighboring allocation excluding each bid that has at least one item in common with the new bid; (d) replacing the current allocation with one of the neighboring allocations, where the one neighboring allocation is selected from the plurality of neighboring allocations stochastically or based on a heuristic value determined for the one neighboring allocation; (e) updating a best allocation with the current allocation if a sum of the values of the bids of the current allocation is greater than, or equal to, a sum of the values of the bids of the best allocation; and (f) repeating steps (c)–(e) M times, wherein in step (d) the one neighboring allocation is selected stochastically a first part of M times and is selected based on the heuristic value a second part of M times.

Preferably, a probability function or random number algorithm is utilized to make the selection in step (d) of the one neighboring allocation either stochastically or based on a heuristic value.

Prior to a first use thereof, the best allocation and/or the sum of the values of the bids of the best allocation are initialized.

The method further includes the step of determining a heuristic value for each of the neighboring allocations, where each heuristic value is an indication of a capacity of its neighboring allocation to increase a sum of the values of the current allocation. The selection of each of the one neighboring allocations is based on the heuristic value therefore indicating that the one neighboring allocation maximizes an increase in the sum of the values of the current allocation over any increase that would be generated by any other neighboring allocation.

The heuristic value for each neighboring allocation can be determined in any manner so long as each heuristic value is an indication of a capacity of its neighboring allocation to increase the sum of the values of the current allocation. One manner of determining a heuristic value for each neighboring allocation includes determining a difference in a sum of the values of the bids of the neighboring allocation and the sum of the values of the bids of the current allocation, and dividing this difference by the total number of items of the bids comprising the neighboring allocation. Depending on the current sum of the values of the bids of the neighboring allocation versus the sum of the values of the bids of the current allocation, the difference in the sum of the values can be a negative difference, a positive difference, or zero.

Step (d) can include identifying a first neighboring allocation having a first heuristic value that has a first predetermined relation to the heuristic values of the other neighboring allocations and identifying a second neighboring allocation having a second heuristic value that has a second predetermined relation to the heuristic values of the other neighboring allocations. Preferably, the first heuristic value is the largest heuristic value and the second heuristic value has a value second largest to the first heuristic value. Next, a first age of a first new bid combined with the current allocation to form the first neighboring allocation is determined. The first age is based on the number of times at least one of steps (c)–(d) is repeated since the new bid comprised a neighboring allocation that replaced a previous current allocation. A second age of a second new bid combined with the current allocation to form the second neighboring allocation is also determined. The second age is based on the number of times at least one of steps (c)–(d) is repeated since the second new bid comprised a neighboring allocation that replaced a previous current allocation. If the first age is greater than the second age, the current allocation is replaced with the first neighboring allocation. If the second age is greater then the first age, the current allocation is stochastically replaced with the second neighboring allocation a first part of X times and is replaced with the first neighboring allocation a second part of X times.

Lastly, the method includes repeating steps (b)–(f) N times, wherein each time step (b) is repeated, the subset of the bids designated as a current allocation is selected stochastically.

We have also invented a method of selecting a winning allocation of bids in a combinatorial auction. The method includes: (a) receiving a plurality of bids each comprising one or more items and a value; (b) designating a subset of the bids as a current allocation, the current allocation having no overlap in the items of its bids; (c) determining a neighboring allocation for each bid not part of the current allocation by combining the bid with the current allocation and deleting from such combination any bid associated with the current allocation having an item that overlaps an item of the bid combined with the current allocation; (d) determining for each neighboring allocation a heuristic indicative of a capacity of the neighboring allocation to increase a sum of the values of the bids of the current allocation; (e) selecting one of the neighboring allocations stochastically a part of M times or based on the heuristics determined in step (d) the remainder of M times; (f) replacing the current allocation with the selected one of the neighboring allocations; (g) if the sum of the values of the bids of the current allocation is greater than or equal to a sum of the values of the bids of a best allocation, substituting the current allocation for the best allocation; and (h) repeating steps (c)–(g) M times.

Preferably, the method further includes the step of repeating steps (b)–(h) N times, where for each repetition of step (b) the subset of the bids of the current allocation is selected stochastically. A probability function or random number algorithm can be utilized in step (e) to select one of the neighboring allocations stochastically or based on the heuristics.

Step (d) preferably includes the steps of: identifying a first heuristic having a value indicative of its neighboring allocations having the capacity to produce a change in the sum of the values of the bids of the current allocation greater than any other neighboring allocation; identifying a second heuristic having a value indicative of its neighboring allocation having the capacity to produce a change in the sum of the values of the bids of the current allocation second only to the neighboring allocation associated with the first heuristic; determining a first age of the bid combined with the current allocation to form the neighboring allocation associated with the first heuristic, the first age determined from the number of steps performed since the bid associated with the first heuristic comprised a neighboring allocation that replaced a previous current allocation; determining a second age of the bid combined with the current allocation to form the neighboring allocation associated with the second heuristic, the second age determined from the number of steps performed since the bid associated with the second heuristic comprised a neighboring allocation that replaced a previous current allocation; if the first age is greater than the second age, replacing the current allocation with the neighboring allocation associated with the first heuristic; and if the second age is greater than the first age, stochastically replacing the current allocation with the neighboring allocation associated with the second heuristic a first part of X times and replacing the current allocation with the neighboring allocation associated with the first heuristic a second part of X times.

A probability function or random number algorithm can be utilized to determine whether the current allocation is replaced with the neighboring allocation associated with the second heuristic or the current allocation is replaced with the neighboring allocation associated with the first heuristic.

Lastly, we have invented a method of selecting one or more bids in a combinatorial auction. The method includes: (a) receiving a plurality of bids each comprising one or more items and a value; (b) designating a subset of the bids as a current allocation; (c) combining each bid not part of the current allocation with the current allocation to form a corresponding neighboring allocation for each bid; (d) selecting one of the neighboring allocations stochastically or based on a heuristic determined for the selected neighboring allocation, said heuristic indicative of a capacity of the selected neighboring allocation to affect a sum of the values of the bids of the current allocation; (e) replacing the current allocation with the selected neighboring allocation; and (f) repeating steps (c)–(e) M times, with the selected neighboring allocation being selected stochastically a first part of M times and with the selected neighboring allocation being selected based on the heuristic a second part of M times.

The method can also include the step of deleting from at least the selected neighboring allocation any bid having an item that overlaps an item of the bid combined with the current allocation to form the selected neighboring allocation. Preferably, in step (d), the one neighboring allocation is selected utilizing simulated annealing, tabu/taboo search or iterative local search.

DETAILED DESCRIPTION OF THE INVENTION

The winner determination problem for combinatorial auction is a difficult computational problem whose solution time grows exponentially with problem size. The present invention is an approximate solution algorithm for winner determination based on the use of stochastic local search techniques. The present invention does not systematically search through the space of possible solutions, but instead involves a random component that is guided through the use of heuristic information. The present invention does not guarantee that an optimal, revenue-maximizing allocation will be found. Despite the lack of guarantees, however, the present invention finds high quality, typically optimal, solutions much faster than existing algorithms. For certain classes of problems, the present invention finds optimal solutions up to one thousand times faster than current state of the art systematic methods.

Figure 1:
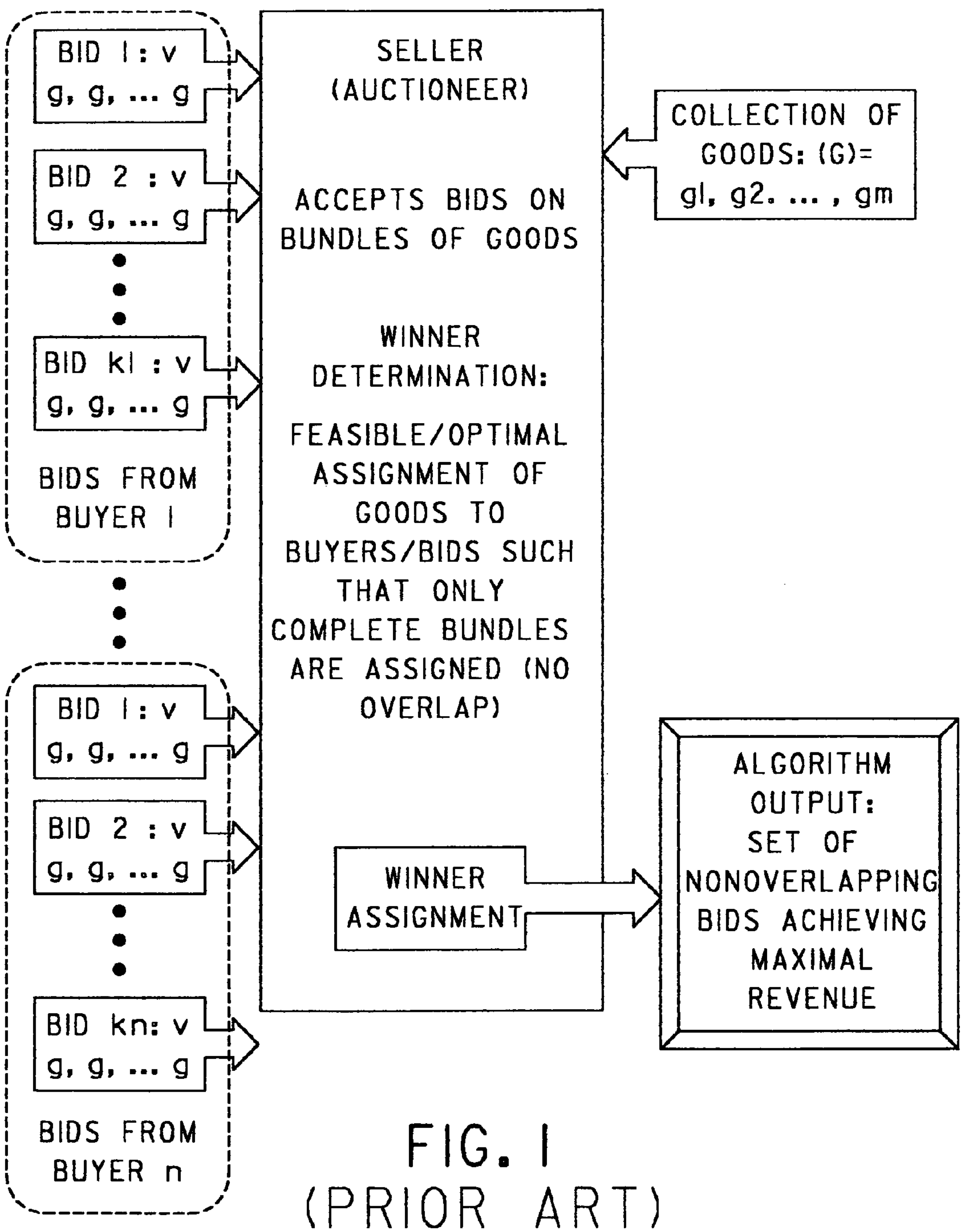
FIG. 1 is a diagrammatic illustration of a combinatorial auction process.
Figure 2:
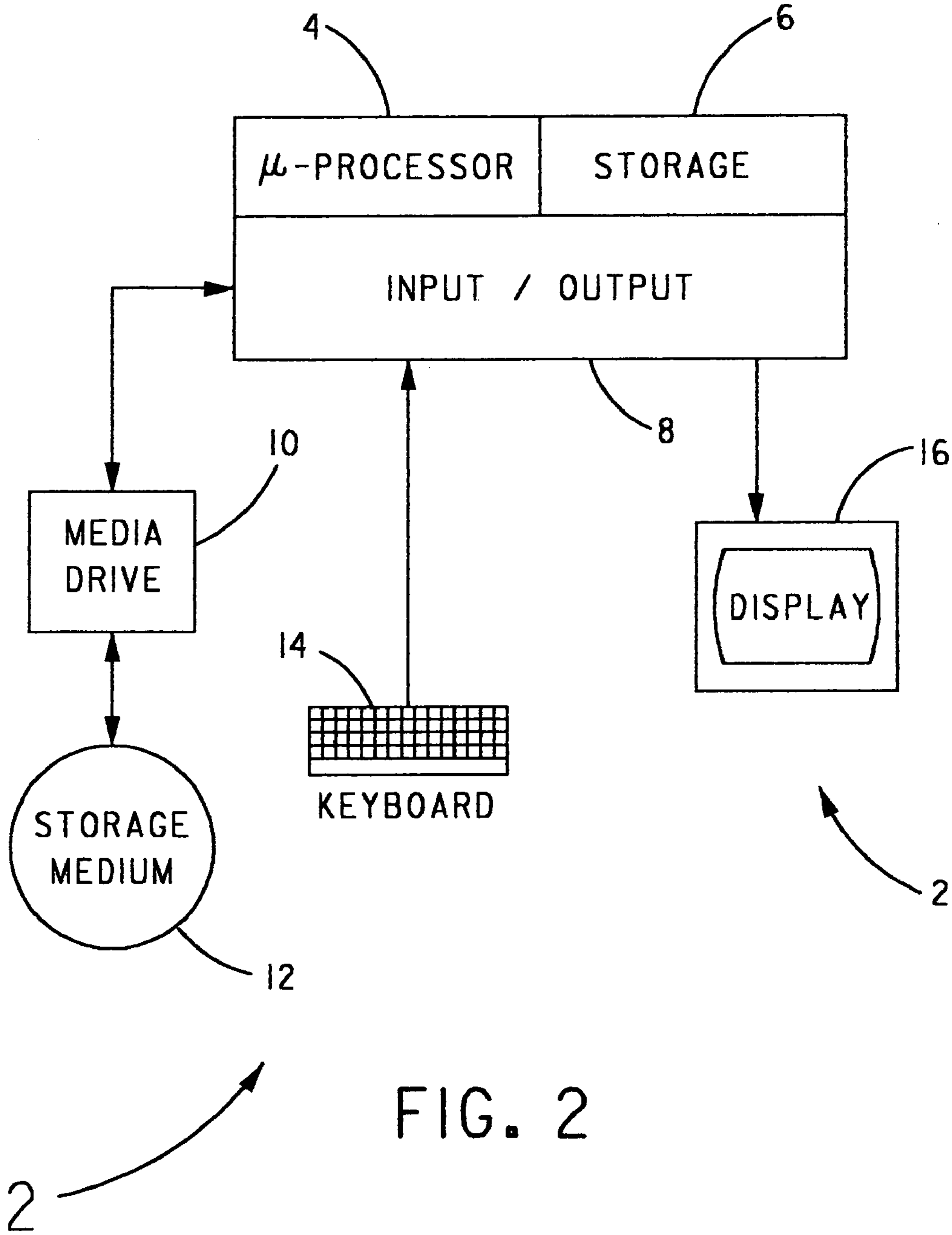
FIG. 2 is a schematic illustration of a computer system which implements computer software which embodies the present invention.

With reference to FIG. 2, the computer implemented method of the present invention is embodied in software which operates on a computer system 2 in a manner known in the art. Computer system 2 includes a microprocessor 4, a storage 6 and an input/output system 8. Computer system 2 can also include a media drive 10, such as a disk drive, CD-ROM drive, and the like. Media drive 10 may operate with a computer-usable storage medium 12 capable of storing the computer-readable program code comprising the computer software which embodies the present invention, which computer-readable program code is able to configure and operate computer system 2 in a manner to implement the present invention. Input/output system 8 may operate with a keyboard 14 and/or a display 16. Computer system 2 is exemplary of computer systems capable of executing computer software which embodies the present invention and is not to be construed as limiting the invention.

Figure 3A:
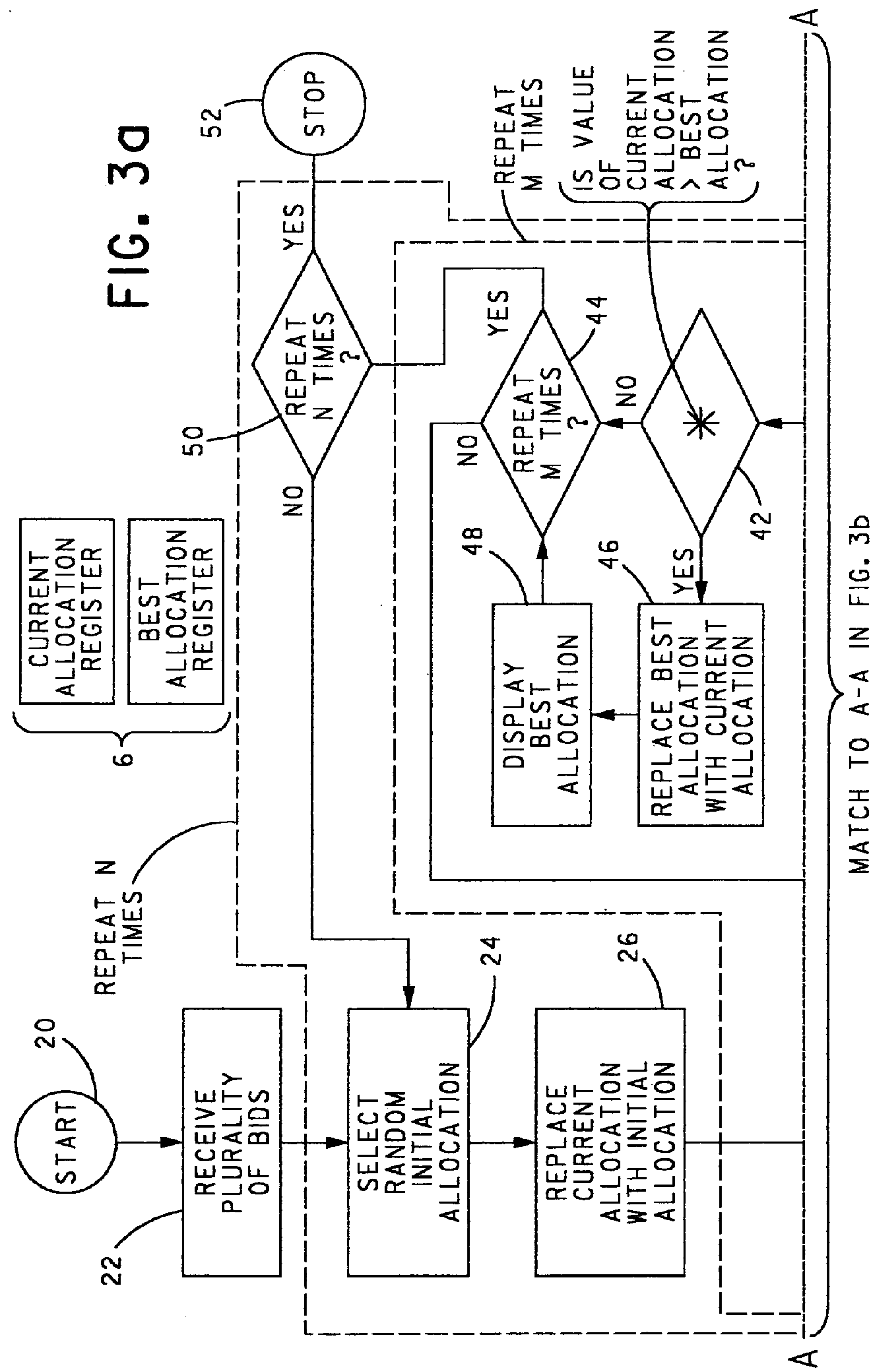
FIGS. 3(*a*)–3(*c*) are a flow chart of the method of the present invention.
Figure 3B:
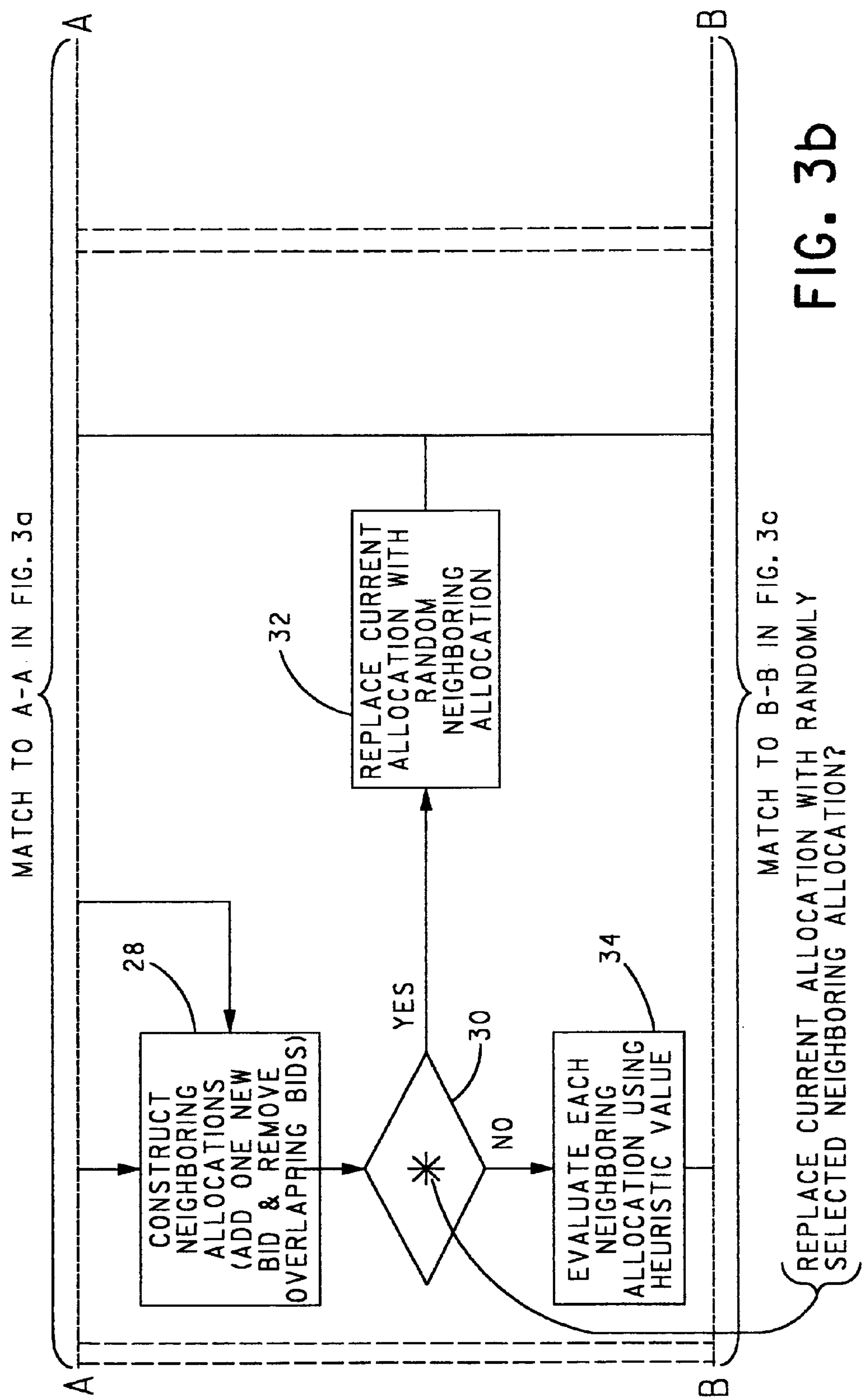
Figure 3C:
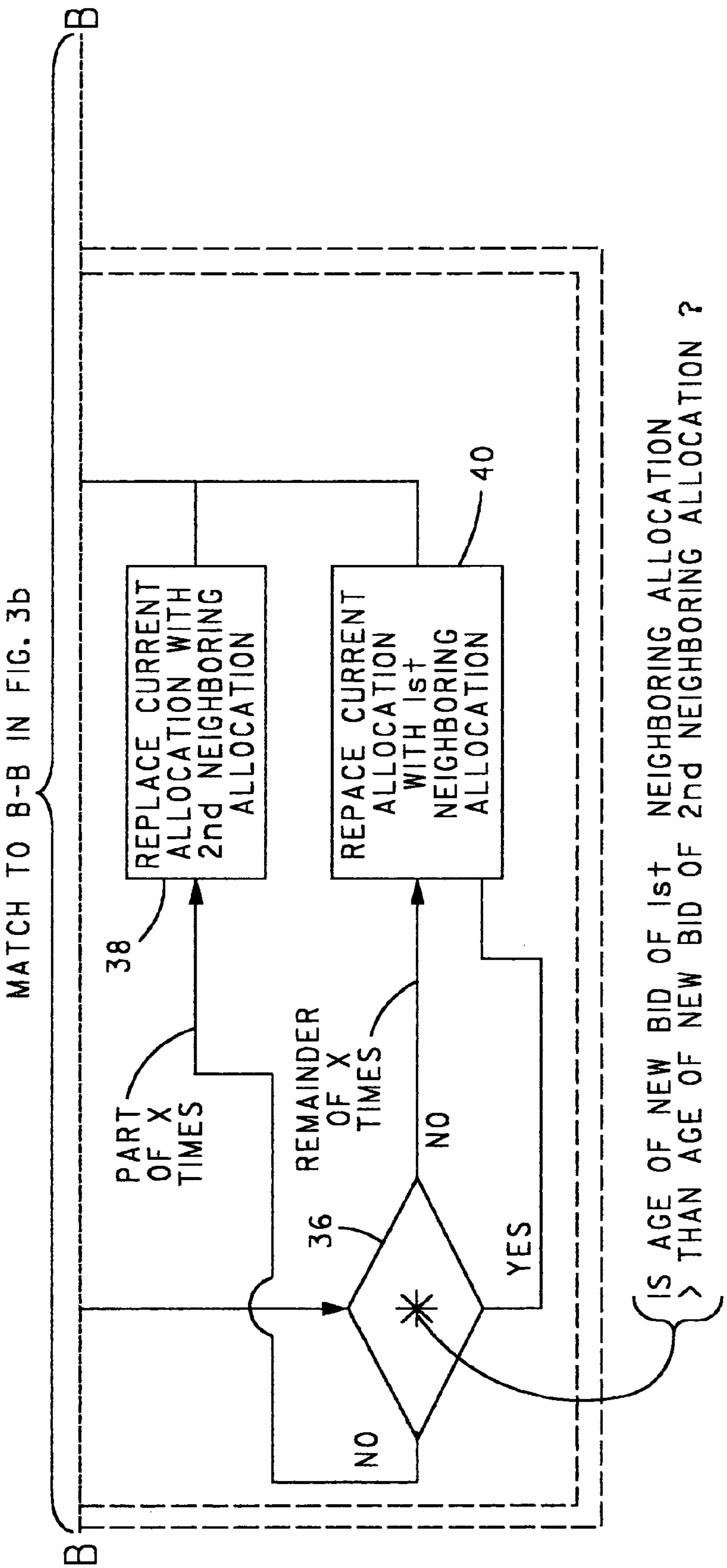

With reference to FIGS. 3(*a*)–3(*c*), the method begins at step 20 where various registers of storage 6 are initialized. These registers include, without limitation, registers for storing data related to a current allocation and a best allocation. Next, program flow advances to step 22 where a plurality of bids is received in storage 6. Each bid includes one or more items and an associated value for the one or more items. Program flow then advances to step 24 where a random, initial allocation of a subset of the bids is selected from the plurality of bids received in step 22. If this random initial allocation includes two or more bids, each bid of the random initial allocation has no bids with overlapping items. Stated differently, each bid of the random initial allocation has no item in common with another bid of the random initial allocation.

Once the random initial allocation is selected in step 24 program flow advances to step 26 where the register of storage 6 reserved for the current allocation is updated with the selected random initial allocation. Thus, the random initial allocation selected in step 24 is stored in the current allocation register.

Next, program flow advances to step 28 where a plurality of neighboring allocations is constructed. Each neighboring allocation is constructed by combining the current allocation with a new bid selected from the bids not part of the current allocation or any other neighboring allocation. To complete construction of each neighboring allocation, any bid of the neighboring allocation having at least one item in common with the new bid is removed from the neighboring allocation.

Next, program flow advances to step 30 where a decision is made whether to replace the current allocation with a randomly selected neighboring allocation. If the decision in step 30 is affirmative (yes), program flow advances to step 32 where the current allocation is replaced with a randomly selected neighboring allocation. If the decision in step 30 is negative (no), however, program flow advances to step 34 where each neighboring allocation is evaluated based on a heuristic value determined for the neighbor.

In step 30, the decision to advance program flow is made by an algorithm, e.g., a probability function, or a computer implementation of a random number generator, which randomly makes this decision each time step 30 is executed. This algorithm, however, is weighted so that a portion of the time program flow advances from step 30 to step 34, while the remainder of the time program flow advances from step 30 to step 32. In one preferred embodiment, the algorithm and its weighting are configured so that from step 30, program flow advances to step 34 eighty-five percent (85%) of the time and advances to step 32 fifteen percent (15%) of the time. More specifically, the algorithm randomizes the decision to advance to step 32 or step 34 so that over hundreds or perhaps thousands of cycles of step 30, the decision to branch to step 34 converges to eighty-five percent (85%) of the time and the decision to branch to step 32 converges to fifteen percent (15%) of the time. It is to be appreciated, however, that the foregoing percentages are exemplary and are not to be construed as limiting the invention.

In step 34, each neighboring allocation is evaluated using a heuristic value determined therefor. The heuristic value determined for each neighboring allocation is an indication of the capacity of the neighboring allocation to increase the sum of the values of the current allocation. Any method or algorithm can be utilized for determining for each neighboring allocation a heuristic value which meets this general criteria. One exemplary method for determining the heuristic value for each neighboring allocation includes determining an increase in the sum of the values of the bids of the neighboring allocation over the sum of values of the bids of the current allocation. In other words, the sum of the values of the bids of the current allocation is subtracted from the sum of the values of the bids of the neighboring allocation. This difference is then divided by the total number of the items of the bids comprising the neighboring allocation. The solution of this division step is the heuristic value assigned to the neighboring allocation.

The process of determining a heuristic value for each neighboring allocation continues until each neighboring allocation is assigned a heuristic value for the current allocation. It should be noted that, if the sum of the values of the bids of the current allocation is greater than the sum of the values of the bids of a neighboring allocation, the heuristic value determined for the neighboring allocation will have a negative value. To this end, it should be appreciated that each heuristic value can have a positive value, a negative value, or zero.

Once each neighboring allocation is assigned a heuristic value, step 34 identifies a first neighboring allocation having the largest heuristic value and identifies a second neighboring allocation having a heuristic value second largest only to the heuristic value of the first neighboring allocation.

Next, program flow advances to step 36 where an age of the new bid combined with the current allocation to form the first neighboring allocation is determined. This age is based on the number of times at least one of steps 28, 30 or 34 is repeated since the new bid comprised a neighboring allocation that replaced a previous current allocation in a previous cycle of steps 32, 38 or 40. In a similar manner, an age of a new bid combined with the current allocation to form the second neighboring allocation is determined.

If the age of the new bid combined with the current allocation to form the first neighboring allocation is greater than the age of the new bid combined with the current allocation to form the second neighboring allocation, program flow advances from step 36 to step 40 where the current allocation is replaced with the first neighboring allocation. However, if the age of the new bid combined with the current allocation to form the second neighboring allocation is greater than age of the new bid combined with the current allocation to form the first neighboring allocation, program flow can advance to step 38 or step 40.

The decision for program flow to advance to step 38 or step 40 is based upon an algorithm similar to the algorithm discussed above in connection with step 30, which randomly or stochastically advances program flow to step 40 a portion of the time and advances to step 38 the remainder of the time. When program flow advances to step 38, the current allocation is replaced with the second neighboring allocation. In contrast, when program flow advances to step 40, the current allocation is replaced with the first neighboring allocation.

The algorithm, or probability function, which decides whether to advance program flow from step 36 to either step 38 or step 40 is configured to make this decision randomly or stochastically. However, this algorithm is weighted so that program flow advances to step 40 a portion of the time and advances to step 38 the remainder of the time. In one embodiment, the algorithm and its weighting are configured so that program flow converges to step 38 fifty percent (50%) of the time and program flow converges to step 40 fifty percent (50%) of the time. These percentages, however, are not to be construed as limiting the invention.

When either step 32, 38 or 40 are complete, program flow advances to step 42 where a comparison is made between the value of the current allocation and the value of the best allocation. More specifically, the sum of the values of bids of the current allocation is compared with the sum of the values of the bids of the best allocation. If the sum of the values of the bids of the current allocation is not greater than the sum of the values of the bids of the best allocation, program flow advances to step 44. However, if the sum of the values of the bids of the current allocation is greater than the sum of the values of the bids of the best allocation, program flow advances to step 46 where the best allocation, stored in the register of storage 6 reserved for the best allocation, is replaced with the current allocation. Thereafter, program flow advances to step 48 where the best allocation is displayed on display 16.

When either step 42 or step 48 is complete, program flow advances to step 44. Step 44 determines if program flow has cycled through at least one of step 28 or 30 M times or if there has been no improvement in step 42 some portion of M times. If program flow has cycled through steps 28 or 30 M times or if there has been some improvement in step 42 some portion of M times, program flow advances from step 44 to step 28. Otherwise, program flow advances from step 44 to step 50.

Step 50 determines if the program flow has cycled through at least one of steps 24 or 26 N times. If not, program flow advances from step 50 to step 24. If, however, program flow has cycled through step 24 or step 26 N times, program flow advances from step 50 to step 52 where the program execution terminates.

The probability functions and heuristic values described above along with the values for M and N are selected so that the method finds quality, perhaps optimal, allocations quickly, perhaps more quickly than systematic methods, even though the present method cannot "prove" that it finds the optimal allocation.

Other methods that can be applied to finding high quality allocations in a combinatorial auction are techniques known as "simulated annealing," "tabu/taboo search", or "iterative local search". It is believed that heretofore the use of simulated annealing, tabu/taboo search or iterative local search for winner determination in combinatorial auctions was not known in the art. It has, however, been discovered by the present inventors, that these techniques can be applied for selecting one or more winning bids in a combinatorial auction.

As can be seen, the present invention provides a stochastic local search method that finds high quality, even optimal, allocations in a combinatorial auction much faster then prior art methods, particularly for large problems, i.e., combinatorial auctions involving goods and bids beyond the hundreds.

The present invention has been described with reference to the preferred embodiments. Obvious modifications and alterations will occur to others upon reading and understanding the preceding detailed description. For example, the present invention can be implemented on multiple computer systems or on a computer with multiple processors, with each system or processor receiving the same plurality of bids and each system or processor executing the method described above. Due to the randomness and use of probability functions, the results output by the systems or the process are complimentary and together these systems or processors can be expected to find good solutions in less time than a single computer system or processor. It is intended that the invention be construed as including all such modifications and alterations insofar as they come within the scope of the appended claims or equivalents thereof.

We claim:

1. A method of selecting one or more winning bids in a combinatorial auction comprising the steps of:

(a) receiving a plurality of bids each comprising one or more items and an associated value for the one or more items;

(b) designating a subset of the bids as a current allocation, wherein, when the current allocation includes two or more bids, each bid of the current allocation has no item in common with another bid of the current allocation;

(c) determining a plurality of neighboring allocations, each neighboring allocation comprising a combination of the current allocation and a new bid selected from the bids not part of the current allocation or any other neighboring allocation, each neighboring allocation excluding each bid that has at least one item in common with the new bid;

(d) replacing the current allocation with one of the neighboring allocations, where a computer selects the one neighboring allocation from the plurality of neighboring allocations stochastically or based on a heuristic value determined for the one neighboring allocation;

(e) updating a best allocation with the current allocation if a sum of the values of the bids of the current allocation is greater than or equal to a sum of the values of the bids of the best allocation; and (f) repeating steps (c)–(e) M times, wherein in step (d) the one neighboring allocation is selected stochastically a first part of M times and is selected based on the heuristic value a second part of M times.

2. The method as set forth in claim 1, wherein, in step (d), the selection of the one neighboring allocation stochastically or based on a heuristic value is based on a probability function or a random number generating algorithm.

3. The method as set forth in claim 1, further including the step of initializing at least one of the best allocation and the sum of the values of the bids of the best allocation.

4. The method as set forth in claim 1, further including the step of determining a heuristic value for each neighboring allocation, where each heuristic value is an indication of a capacity of its neighboring allocation to increase a sum of the values of the current allocation.

5. The method as set forth in claim 4, wherein the selection of each of the one neighboring allocations is based on the heuristic value therefor indicating that the one neighboring allocation maximizes an increase in the sum of the values of the current allocation over any increase that would be generated by any other neighboring allocation.

6. The method as set forth in claim 4, wherein determining the heuristic value for each neighboring allocation includes the steps of:

determining a difference in a sum of the values of the bids of the neighboring allocation and the sum of the values of the bids of the current allocation; and dividing the difference in the sum of the values by the total number of items of the bids comprising the neighboring allocation.

7. The method as set forth in claim 6, wherein the difference in the sum of the values is one of a negative difference, a positive difference and zero.

8. The method as set forth in claim 4, wherein step (d) includes the steps of:

identifying a first neighboring allocation having a first heuristic value that has a first predetermined relation to the heuristic values of the other neighboring allocations;

identifying a second neighboring allocation having a second heuristic value that has a second predetermined relation to the heuristic values of the other neighboring allocations;

determining a first age of a first new bid combined with the current allocation to form the first neighboring allocation, the first age based on the number of times at least one of steps (c)–(d) is repeated since the first new bid comprised a neighboring allocation that replaced a previous current allocation;

determining a second age of a second new bid combined with the current allocation to form the second neighboring allocation, the second age based on the number of times at least one of steps (c)–(d) is repeated since the second new bid comprised a neighboring allocation that replaced a previous current allocation;

if the first age is greater than the second age, replacing the current allocation with the first neighboring allocation; and if the second age is greater than the first age, stochastically replacing the current allocation with the second neighboring allocation a first part of X times and replacing the current allocation with the first neighboring allocation a second part of X times.

9. The method as set forth in claim 8, wherein the first heuristic value is the largest heuristic value and the second heuristic value has a value second largest only to the first heuristic value.

10. The method as set forth in claim 9, wherein the largest heuristic value is large in a positive sense.

11. The method as set forth in claim 8, wherein X times is less than M times.

12. The method as set forth in claim 1, further including the step of repeating steps (b)–(f) N times, wherein, each time step (b) is repeated, the subset of the bids designated as the current allocation is selected stochastically.

13. A method of selecting a winning allocation of bids in a combinatorial auction comprising the steps of:

(a) receiving a plurality of bids each comprising one or more items and a value;

(b) designating a subset of the bids as a current allocation, the current allocation having no overlap in the items of its bids;

(c) determining a neighboring allocation for each bid not part of the current allocation by combining the bid with the current allocation and deleting from such combination any bid associated with the current allocation having an item that overlaps an item of the bid combined with the current allocation;

(d) determining for each neighboring allocation a heuristic indicative of a capacity of the neighboring allocation to increase a sum of the values of the bids of the current allocation;

(e) causing a computer to select one of the neighboring allocations stochastically a part of M times or based on the heuristics determined in step (d) the remainder of M times;

(f) replacing the current allocation with the selected one of the neighboring allocations;

(g) if the sum of the values of the bids of the current allocation is greater than or equal to a sum of the values of the bids of a best allocation, substituting the current allocation for the best allocation; and (h) repeating steps (c)–(g) M times.

14. The method as set forth in claim 13, further including the step of repeating steps (b)–(h) N times, wherein for each repetition of step (b) the subset of the bids of the current allocation is selected stochastically.

15. The method as set forth in claim 13, wherein a probability function or a random number generating algorithm is utilized to select each one of the neighboring allocations stochastically or based on the heuristics in step (e).

16. The method as set forth in claim 13, wherein step (d) includes the steps of:

identifying a first heuristic having a value indicative of its neighboring allocation having the capacity to produce a change in the sum of the values of the bids of the current allocation greater than any other neighboring allocation;

identifying a second heuristic having a value indicative of its neighboring allocation having the capacity to produce a change in the sum of the values of the bids of the current allocation second only to the neighboring allocation associated with the first heuristic;

determining a first age of the bid combined with the current allocation to form the neighboring allocation associated with the first heuristic, the first age determined from the number of steps performed since the bid associated with the first heuristic comprised a neighboring allocation that replaced a previous current allocation;

determining a second age of the bid combined with the current allocation to form the neighboring allocation associated with the second heuristic, the second age determined from the number of steps performed since the bid associated with the second heuristic comprised a neighboring allocation that replaced a previous current allocation;

if the first age is greater than the second age, replacing the current allocation with the neighboring allocation associated with the first heuristic; and if the second age is greater than the first age, stochastically replacing the current allocation with the neighboring allocation associated with the second heuristic a first part of X times and replacing the current allocation with the neighboring allocation associated with the first heuristic a second part of X times.

17. The method as set forth in claim 16, wherein a probability function or a random number generating algorithm is utilized to determine whether the current allocation is replaced with the neighboring allocation associated with the second heuristic or the current allocation is replaced with the neighboring allocation associated with the first heuristic.

18. A method of selecting one or more bids in a combinatorial auction comprising the steps of:

(a) receiving a plurality of bids each comprising one or more items and a value;

(b) designating a subset of the bids as a current allocation;

(c) combining each bid not part of the current allocation with the current allocation to form a corresponding neighboring allocation for each bid;

(d) causing a computer to select one of the neighboring allocations stochastically or based on a heuristic determined for the selected neighboring allocation, said heuristic indicative of a capacity of the selected neighboring allocation to affect a sum of the values of the bids of the current allocation;

(e) replacing the current allocation with the selected neighboring allocation; and (f) repeating steps (c)–(e) M times, with the selected neighboring allocation being selected stochastically a first part of M times and with the selected neighboring allocation being selected based on the heuristic a second part of M times.

19. The method as set forth in claim 18, further including the step of deleting from at least the selected neighboring allocation any bid having an item that overlaps an item of the bid combined with the current allocation to form the selected neighboring allocation.

20. The method as set forth in claim 18, wherein step (d) includes utilizing simulated annealing, tabu/taboo search or iterative local search to select the one neighboring allocation.

* * * * *